Aug. 11, 1953   J. C. SLONNEGER   2,648,400
INTERNAL-COMBUSTION ENGINE LUBRICATING SYSTEM
Original Filed March 14, 1946   4 Sheets-Sheet 1

INVENTOR.
John C. Slonneger
BY
ATTORNEYS

Aug. 11, 1953  J. C. SLONNEGER  2,648,400
INTERNAL-COMBUSTION ENGINE LUBRICATING SYSTEM
Original Filed March 14, 1946  4 Sheets-Sheet 3

INVENTOR.
John C. Slonneger
BY
Ashley & Ashley
ATTORNEYS

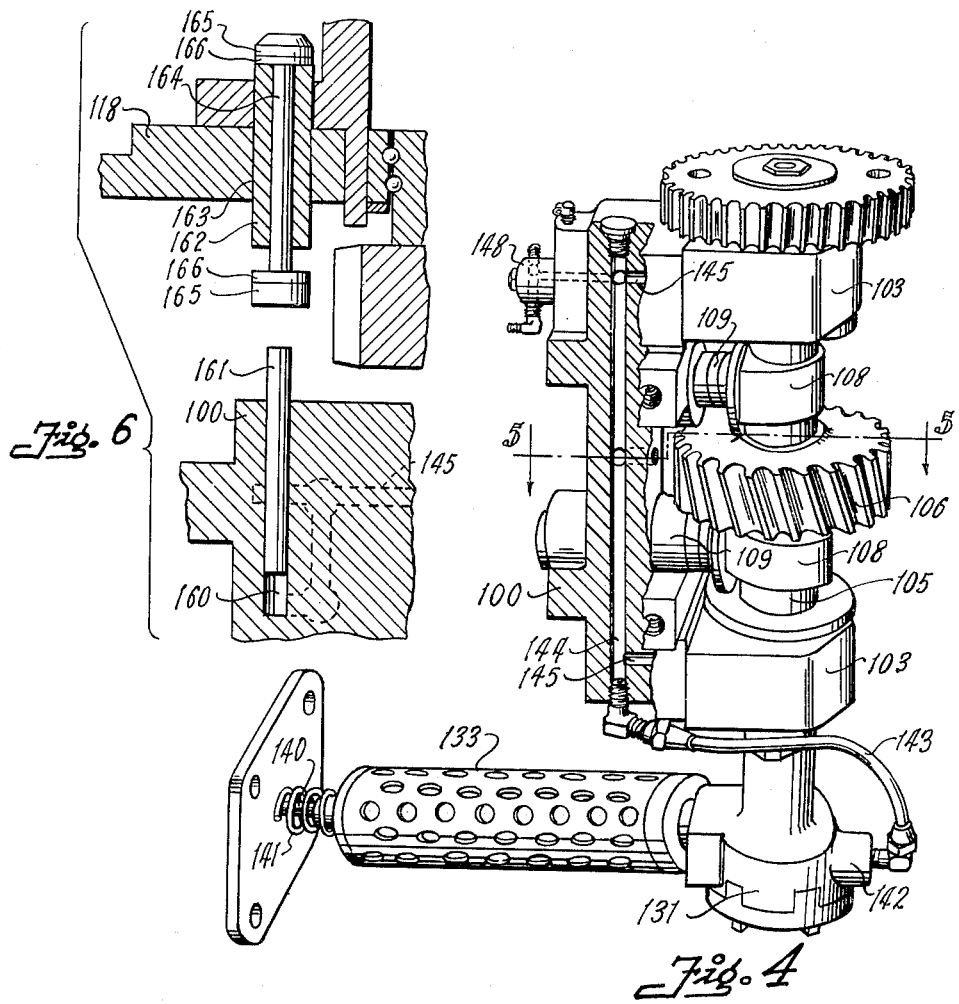
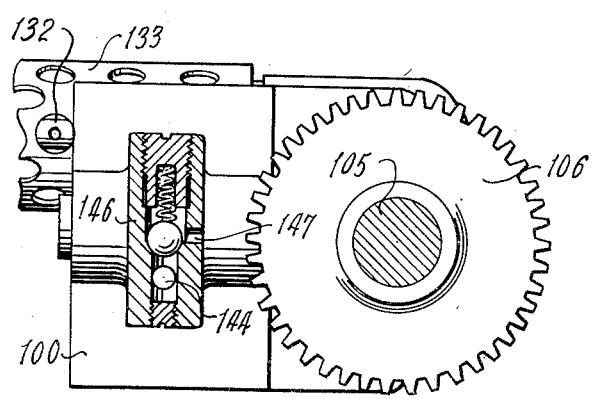

Patented Aug. 11, 1953

2,648,400

UNITED STATES PATENT OFFICE 2,648,400

INTERNAL-COMBUSTION ENGINE LUBRICATING SYSTEM

John C. Slonneger, Dallas, Tex., assignor to The Continental Supply Company, Dallas, Tex., a corporation of Delaware Original application March 14, 1946, Serial No. 654,427. Divided and this application May 1, 1948, Serial No. 24,607

3 Claims. (Cl. 184—6)

This invention relates to new and useful improvements in internal combustion engine lubricating systems.

One object of the invention is to provide an improved lubricating system for single cylinder internal combustion engines.

Another object of the invention is to provide an improved pressure lubricating system for internal combustion engines wherein the number of pipes and pipe joints is reduced and also wherein pipe joints or connections are eliminated at the valve head, thus making for simplicity and ready connecting and disconnecting of said head with the engine cylinder or block and precluding connecting of the head to the cylinder block with oil lines.

A further object of the invention is to provide an oil pump and a strainer therefor which latter is arranged to be quickly and easily removed from the crankcase for cleaning.

Still another object of the invention is to provide an oil pump of the gear type which is directly operated by the camshaft at the speed of the latter and without intermediate drive mechanism, whereby operation of the engine without lubrication is precluded.

A still further object of the invention is to provide an improved means for testing the oil pressure in the lubricating system which is simple and positive in operation and structure.

Another object of the invention is to provide an improved oil-collector ring for the crankshaft which is full floating and substantially free from wear and the oil leaks caused by such wear.

Yet another object of the invention is to provide improved pre-heating means for the lubricant passing to the engine head.

A still further object is to provide an improved and novel structure for lubricating the cam gear of an engine.

A construction designed to carry out the invention will be hereinafter described together with other features of the invention.

Figure 1:
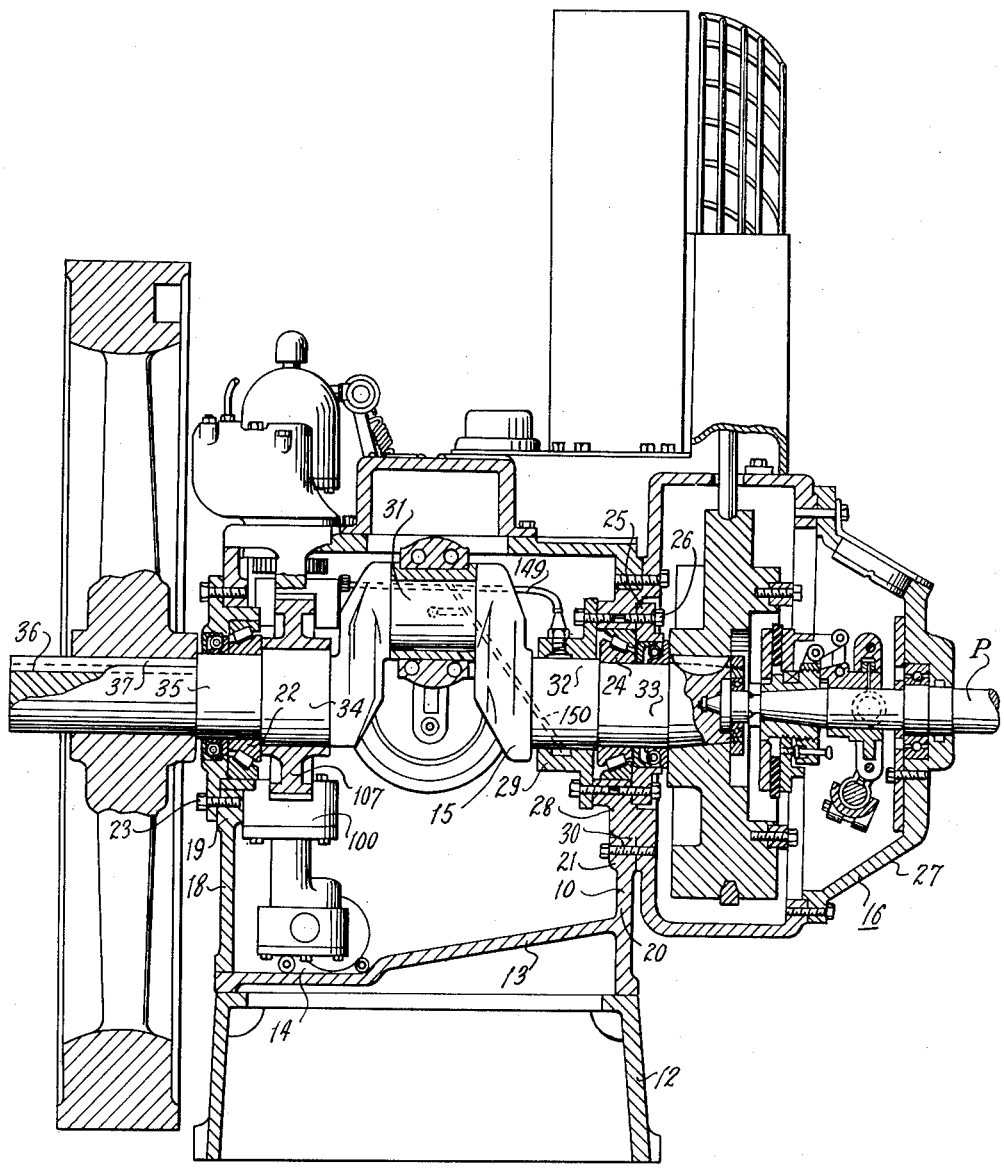
Figure 2:
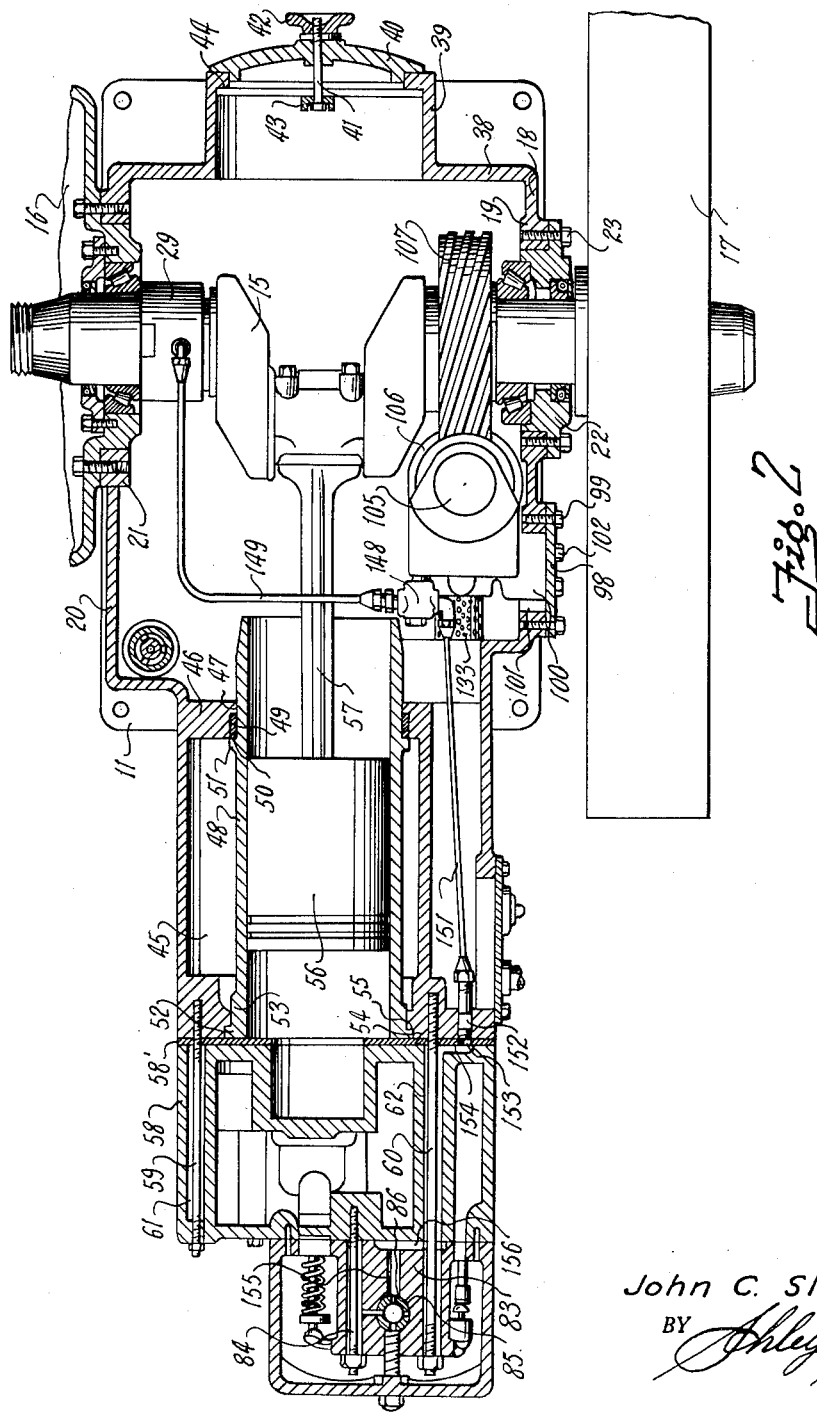
Figure 3:
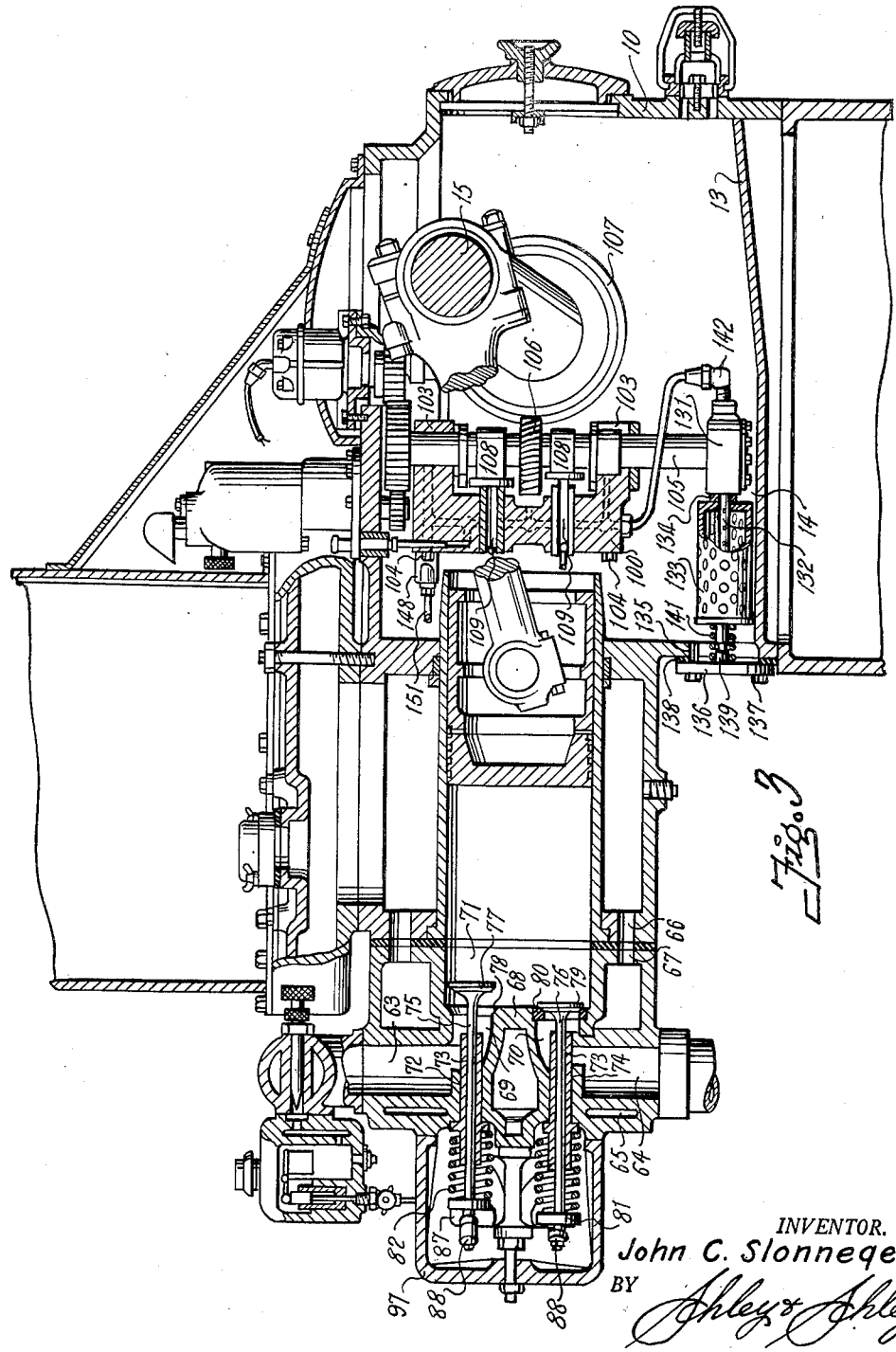

The invention will be more readily understood from a reading of the following specification and by reference to the accompanying drawings, wherein an example of the invention is shown, and wherein:

Fig. 1 is a transverse sectional view through the crankshaft portion of an internal combustion engine having a lubricating system constructed in accordance with the invention, Fig. 2 is a horizontal cross-sectional view of the engine, Fig. 3 is a longitudinal vertical sectional view of the same, Fig. 4 is a view, partly in perspective and partly in section, of the camshaft and oil pump assembly, Fig. 5 is a horizontal cross-sectional view taken approximately on the line 5—5 of Fig. 4, and Fig. 6 is a vertical sectional view of the tactile pressure indicator.

This application is a division of my co-pending application filed March 14, 1946, Serial No. 654,-427, now Patent No. 2,590,134, issued March 25, 1952.

In the drawings, the numeral 10 designates a hollow crankcase which is provided with external horizontal lugs 11 at its corners whereby the crankcase may be bolted upon a hollow base 12 or secured upon any other suitable support. The crankcase, as is best shown in Figs. 1 and 3, is provided with a false bottom 13 which inclines toward a sump 14 at one side thereof. A crankshaft 15 extends transversely through the crankcase and is connected at one end with a clutch designated generally at 16 on the clutch side of the engine or crankcase. A power take-off shaft P is suitably connected into the clutch mechanism. A flywheel 17 is mounted on the opposite end of the crankshaft on the flywheel side of the engine or crankcase. Flywheels on this type of engines are usually provided with comparatively heavy rims so as to aid in maintaining momentum.

While the crankshaft may be suitably mounted as desired in the crankcase, I prefer to form the wall 18, which is on the flywheel side, with an integral annular collar 19 and to provide the opposite wall 20, which is on the clutch side, with an integral annular collar 21. Although the crankshaft 15 is supported in axially alined bearings, and the collars 19 and 21 are axially alined, they are of different diameters. A roller bearing assembly 22 is secured in the collar 19 by bolts 23.

The clutch 16 includes a cylindrical hollow casing 27. This casing is provided on the inner side of its medial portion with an outwardly-offset, annular, hollow boss 28 which is inserted in the collar 21, and a roller bearing assembly 24 is mounted in this boss. The bearing assembly 24 is confined within the boss by a retaining ring 25 secured on the outer side of the boss by tie bolts 26. An annular lubricant collector 29 is secured adjacent the inner end of the boss in the crankcase.

The clutch case 27 is secured to the collar 21 by bolts 30. The crankshaft 15 is provided with the usual crank 31 at its medial portion and is stepped on each side thereof to provide annular bearing faces 32, 33, and 35, respectively, and an annular gear-mounting face 34 on the flywheel side, between the crank and the face 35. The face 32 has a turning fit in the collector 29 while the face 33 is supported in the bearing assembly 24 and extends through the ring 25. The face 35 is supported in the roller bearing assembly 22. Outwardly of the face 35, the end of the crankshaft is provided with a key seat 36 receiving a key 37 whereby the flywheel is secured on said shaft.

The outer end wall 38 of the crankcase is provided with an outwardly-extending annular sleeve 39 which forms a hand-way. A dished cover 40 is attached to the outer end of the sleeve by means of a central bolt 41 and hand nut 42. The head of the bolt is secured in a bar 43 which has either end engaging an annular shoulder 44 within the sleeve, whereby the cover is removably fastened on the crankcase opposite the crankshaft.

The inner end of the crankcase is extended to form a cooling jacket 45 which is considerably less in cross-sectional area than the crankcase proper. Near its inner end, the jacket is formed with an internal transverse web 46 which has a cylindrical opening 47 for snugly receiving one end of a piston cylinder or liner 48. The opening 47 is counterbored at 49 to receive a packing ring 50 which snugly embraces the cylinder. The inner end of the cylinder projects slightly into the crankcase as is best shown in Figs. 2 and 3. The cylinder is formed with an annular bead 51 which engages the packing ring 50 and forces it into the counterbore 49 as well as holding it in place. The outer end of the cylinder is provided with an external annular flange 52 and an annular boss 53 extending inwardly from said flange and of less diameter than said flange. At the outer end of the jacket, an annular abutment 54 is formed in the jacket 45 and provided with an annular internal seat 55 complementary to the flange and boss to snugly receive the same. The parts which have been described support the cylinder in proper position to receive a piston 56 connected to the crank 31 by means of a suitable connecting rod 57. The cylinder is removable and may be withdrawn from the jacket for any purpose.

This engine is of the valve-in-head type, and therefore, a cylinder head 58 is mounted on the outer end of the jacket 45 and secured to the abutment 54 by stud bolts 59 and 60. It will be observed that the outer faces of the abutment and cylinder are flush and the inner face of the head is likewise flush so that a head gasket 58' may be secured therebetween to form a fluid-tight joint. The head 58 is generally hollow and provided with passages and ducts, which will be hereinafter described. The bolts 59 and 60 extend loosely through sleeves 61 and 62, respectively, within the head and made integral therewith. The head 58 is cast with a vertical intake duct 63 in its upper portion and a vertical exhaust duct 64 in its lower portion. These ducts are spaced from the vertical walls of the head so as to provide a circulating space or passages 65 therearound, as is common in this art, and this space communicates with ports 66 in the abutment 54 through ports 67 in the face of the head. A coolant supplied to the jacket 45, may thus circulate through the head and around the sleeves 61 and 62. The inner ends of the ducts 63 and 64 are made integral with a valve block indicated generally by the numeral 68.

The inner ends of the ducts merge into inwardly-directed elbows or passages 69 and 70 (Fig. 3). These passages communicate with an annular cylinder chamber 71 formed integral with the head 58 and alined with the cylinder 48.

The valve block 68 is formed with transverse counterbored openings 72 at the inner ends of the ducts for receiving flanged bushings 73 for valve stems 75 and 76 respectively. An intake valve 77 fastened on the inner end of the stem 75 engages an annular seat 78 at the inner end of the passage 69; while an exhaust valve head 79 engages an insert seat 80 countersunk in the inner end of the passage 70. The valve 77 controls the intake of fuel to the cylinder; while the valve 80 controls the exhaust from the cylinder. The outer ends of the valve stems carry collars 81 and coil springs 82 are confined between these collars and the bushings in the usual manner; such springs being under sufficient tension to hold the valves on their seats.

A split rocker bracket 83 is removably secured on the outer end of the head 58 and held in place by the bolt 60 which passes through one side thereof and at its opposite side, by a bolt 84 (Fig. 2) which is screwed into the head. This bracket is formed with an integral and enlarged bearing collar 85 through which a tubular rocker shaft 86 extends. The shaft is clamped in the collar and on each side of the collar the hubs 87 of a pair of rocker arms 88 are rotatably mounted. A cover housing 97 is removably mounted on the head for enclosing the rocker mechanism.

One of the important features of the invention resides in the camshaft and lubricating unit which is mounted in the crankcase and includes a hanger block 100. This block is disposed vertically on the flywheel side and attached to a cover plate 98 secured on the vertical wall of the casing by bolts 99, whereby an opening 101 is left in the side wall. The inner face of the plate 98 is machined to provide a proper mounting for the block 100, and the obtaining of such a mounting is the reason for utilizing the mode of structure, the machining of an interior wall of the crankcase being undesirable. The block is attached to the cover plate by bolts 102. At each end of the block, solid bearing boxes 103 are fastened by bolts 104. A camshaft 105 is journaled in these boxes and a pinion 106 fastened on the medial portion thereof. This pinion is driven by a gear 107 fastened on the face 35 of the crankshaft 15. The gear and pinion are of the helical or worm type and are disposed in planes at right angles to each other.

On each side of the pinion and between the boxes, cams 108 are provided and the throws of these cams are disposed in the proper angular adjustment for actuating valve lifters 109 attached to the push rods which extend through the jacket 45 and engage the ends of the rocker arms 88, and thus, when the crankshaft is revolved, rotation is imparted to the gear 107 and pinion 106, whereby the camshaft is rotated and the rocker arms 88 are actuated to alternately depress the inlet and exhaust valves.

The balance of the lubricating system of this engine is designed and constructed to be as efficient and yet as simple as possible, with a minimum of oil lines and feeders, the basic parts of the engine being utilized to conduct the lubricating oil rather than separate pipes. The lower end of the camshaft 105 is extended and connected to a suitable oil pump 131 positioned near the bottom of the crankshaft and having its inlet pipe 132 arranged to pick up lubricating oil from the sump 14. A suitable screen or filter 113, which may be of any desirable type, has a sliding fit over the inlet pipe 132 and engages a gasket 134 disposed at the inner end thereof. The filter, of course, serves to prevent dirt and foreign matter from entering the pump 131 and the balance of the lubricating system.

To allow ready servicing and replacement of the filter 133, an opening 135 is formed in the vertical wall of the crankcase adjacent the end of the filter, and is adapted to be closed by a plate 136 held by suitable machine screws 137. A gasket 138 seals the joint between the plate 136 and the crankcase wall. The plate is provided with a centrally-located boss 139 on its inner face and a stud bolt 140 is secured therein. The bolt 140 has a close sliding fit within an opening in the outer end of the filter and has a nut secured to its inner end whereby the filter is slidably secured to the plate 136. A coiled spring 141 is compressed between the plate and the filter so that when the plate is in place, the filter is urged inwardly into engagement with the gasket 134. Obviously, removal of the plate 136 allows the quick and easy removal of the filter through the opening 135 for cleaning or replacement.

The pressure outlet 142 of the oil pump 131 is connected by a pipe 143 to the lower end of a vertical oil passage 144 formed in the block 100. Lateral passages 145 communicate with the passage 144 and direct lubricating oil onto the bearing surfaces of the camshaft 105. An oil excess pressure relief valve 146 is mounted in the medial portion of the block 100 so as to communicate with the passage 144. The valve 146 is of the usual adjustable spring-loaded type and discharges through an opening 147 directed through the block 100 toward the pinion 106 secured on the camshaft. Thus, oil passing through the valve is caused to flow upon the pinion 106 and thereby lubricate this pinion and the gear 107 disposed on the crankshaft, and to some extent, the bearing assembly 22.

An oil outlet manifold fitting 148 is mounted in the upper end of the block 100 in communication with the passage 144, and has connected in one side thereof an oil pipe 149 extending through the crankcase to the oil collector ring or collar 29. The face 32 is provided with an opening 150 which extends through the crankshaft in the usual manner to provide lubrication for the connecting rod bearing and the bearing face 35. If desired, oil may also be conducted to the wrist-pin bearing of the connecting rod.

A second oil pipe 151 extends outwardly from the fitting 148 and connects into an opening 152 formed in the abutment 54 and registering with a similar opening 153 in the gasket 58'. A milled groove 154 extends laterally of the sleeve 62 so as to communicate with the opening 153, whereby lubricating oil may flow from the pipe 151 through the openings 152 and 153 and the groove 154 to the annular space around the bolt 60, and thus through the sleeve 62 to the outer end of the head 59. The gasket 58' effectively seals this connection.

It is pointed out, that the sleeve 62 is surrounded by the water jacket wherein a temperature approaching 212° F. exists. Thus, the sleeve acts as a heat exchanger to warm the oil flowing therethrough and thereby maintains a higher oil temperature throughout the lubricating system. In engines of this type, and especially in colder climates, this result is desirable since oil temperatures usually are too low for efficient lubrication, especially in the cylinder head of the engine.

The rocker arm bracket 83 is formed with a passage 155 extending inwardly from the bore of the collar 85, and a groove 156 communicating between the upper end of the collar 62 and the passage 155 to pass lubricant to the rocker arm structure.

It is pointed out, that this lubricating system for the valve and rocker arms does not require the use of separate oil lines which are subject to damage and leakage, and possibly may be incorrectly connected by a person working on the engine, or not connected at all. The oil lines form an integral part of the rocker bracket and the cylinder head and are removed and replaced when these elements are.

An improved means for determining oil pressure has been provided. The upper end of the block 100 is formed with an upwardly-extending passage 160 communicating with the passage 144, and counterbored to receive a cylindrical plunger 161, which has a sliding fit within the counterbore. Since the oil pressure exerted by the oil pump is directed against the lower end of the plunger, the plunger will react to such pressure to move longitudinally within the counterbore. A bushing 162 is secured within an opening 163 formed directly above the plunger in the top wall 118 of the crankcase. A feeler rod 164 has a sliding fit within the bushing and is provided with flanged caps 165 at either end to retain the rod within said bushing. The lower cap is adapted to be engaged by the plunger 161 so as to move the rod upwardly as the plunger moves thus. A packing ring 166 is confined on the inner side of each of the caps 165 so as to seal the space between the rod 164 and the bushing 163 when the rod is in its upper or lower position.

When the engine is in operation, the pressure exerted by the oil pump forces the plunger 161 and thus the rod 164 upwardly. Manual pressing down of the feeler rod must overcome this pressure, and thus will indicate to the operator the amount of oil pressure being developed. This pressure gauge is reasonably accurate, and is almost entirely free from susceptibility to damage due to accidents or vibration or rough treatment. An ordinary pressure gauge is not protected from this damage, and on engines which have been in use for some time, may usually be found to be broken or damaged, or so lacking in accuracy as to be useless.

Thus, an entire lubrication system is provided which is simple, trouble-free and wherein means are provided to safeguard against normal mistakes and rough treatment caused by operating personnel. In this connection, it is pointed out that the connection of the camshaft 105 directly to the oil pump 175 substantially eliminates the possibility of an oil system failure independent of a general engine failure. So long as the camshaft operates, the oil pump will be driven, and should the camshaft fail, the engine would stop. So damage due to oil system failures are minimized.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In an internal combustion engine lubricating system, a camshaft supporting block having oil passages therein, a camshaft journaled in said supporting block, valve lifters carried by the supporting block and reciprocable therein, said valve lifters being engaged and reciprocated by the camshaft, a driven gear carried upon the camshaft for revolving the same and disposed between the valve lifters, the supporting block including oil passages leading to said camshaft for lubricating the same, an oil pump directly connected to one end of said camshaft and carried by said supporting block, an oil conductor connected between the pump and the oil passages of the supporting block, and an excess oil pressure relief valve carried by the camshaft supporting block communicating with the oil passages, said oil pressure relief valve having a discharge port opening exteriorly of the camshaft supporting block and directed toward the periphery of the driven gear for lubricating the same.

2. In an internal combustion engine lubricating system, a unitary camshaft and valve lifter assembly including, a camshaft supporting block constructed to be removably secured in an engine crankcase and having oil passages therein, a camshaft journaled in said supporting block, valve lifters mounted in the block and engaging the camshaft for reciprocation thereby, an oil pump directly connected to one end of the camshaft and carried by the supporting block, a conductor connected between the pump and the oil passages of the block, an excess oil pressure relief valve carried by the supporting block and communicating with the oil passages thereof, the oil pressure relief valve having a discharge port opening exteriorly of the block closely adjacent the camshaft and directed toward the camshaft, a driven gear on the camshaft for driving the camshaft, the oil pressure relief valve discharge port being directed toward said driven gear, and the valve lifters engaging the camshaft upon each side of the gear so as to be lubricated by oil splash from the relief valve discharging of said gear.

3. In an internal combustion engine lubricating system, a unitary camshaft and valve lifter assembly including, a camshaft supporting block constructed to be removably secured in an engine crankcase and having oil passages therein, a pair of spaced bearing boxes extending from the supporting block, a camshaft journaled in said boxes, valve lifters mounted in the block and projecting therefrom between said boxes toward the camshaft and engaging the camshaft for reciprocation thereby, an oil pump directly connected to one end of the camshaft and carried by the supporting block, a conductor connected between the pump and the oil passages of the block, an excess oil pressure relief valve carried by the supporting block and communicating with the oil passages thereof, the oil pressure relief valve having a discharge port opening exteriorly of the block closely adjacent the camshaft and directed toward the camshaft, and a driven gear on the camshaft for driving the same, the gear being positioned between the valve lifters in the path of discharge from the oil pressure relief valve discharge port whereby splash from said port lubricates the valve lifters.

JOHN C. SLONNEGER.

References Cited in the file of this patent

UNITED STATES PATENTS

| Number | Name | Date |
|---|---|---|
| 1,221,078 | Morris | Apr. 3, 1917 |
| 1,230,460 | Brush | June 19, 1917 |
| 1,241,332 | Birkigt | Sept. 25, 1917 |
| 1,617,986 | Blank | Feb. 15, 1927 |
| 1,800,585 | Woodson | Apr. 14, 1931 |
| 1,804,643 | Ricardo | May 12, 1931 |
| 1,900,968 | Woolson | Mar. 14, 1933 |
| 1,910,752 | Coles | May 23, 1933 |
| 2,296,178 | Patterson | Sept. 15, 1942 |
| 2,372,286 | Mieras | Mar. 27, 1945 |

FOREIGN PATENTS

| Number | Country | Date |
|---|---|---|
| 106,964 | Great Britain | June 4, 1917 |
| 355,400 | Great Britain | Aug. 27, 1931 |
| 55,038 | Norway | Mar. 25, 1935 |